United States Patent [19]

Knöfel et al.

[11] Patent Number: 4,593,117

[45] Date of Patent: Jun. 3, 1986

[54] PROCESS FOR THE PREPARATION OF N- AND O-SUBSTITUTED DIURETHANES AND/OR POLYURETHANES

[75] Inventors: Hartmut Knöfel, Odenthal; Stefan Penninger, Dormagen; Günther Hammen, Dormagen; Peter Heitkämper, Dormagen, all of Fed. Rep. of Germany

[73] Assignee: Bayer Aktiengesellschaft, Leverkusen, Fed. Rep. of Germany

[21] Appl. No.: 678,430

[22] Filed: Dec. 5, 1984

Related U.S. Application Data

[63] Continuation of Ser. No. 354,976, Mar. 5, 1982, abandoned.

[30] Foreign Application Priority Data

Mar. 18, 1981 [DE] Fed. Rep. of Germany ....... 3110573

[51] Int. Cl.$^4$ ................ C07C 125/073; C07C 125/077
[52] U.S. Cl. ......................................... 560/025; 560/9; 560/148; 560/115; 560/158
[58] Field of Search ..................... 560/25, 158, 9, 148, 560/115

[56] References Cited

U.S. PATENT DOCUMENTS 4,278,805 7/1981 Merger et al. ..................... 560/25
4,290,970 9/1981 Merger et al. .................... 560/25 X

FOREIGN PATENT DOCUMENTS 0018581 11/1980 European Pat. Off. ............. 560/25
0018583 11/1980 European Pat. Off. ............. 560/25
2917490 11/1980 Fed. Rep. of Germany .
2917568 11/1980 Fed. Rep. of Germany .
2943480 5/1981 Fed. Rep. of Germany .
2943481 5/1981 Fed. Rep. of Germany .
2943550 5/1981 Fed. Rep. of Germany .
2943551 5/1981 Fed. Rep. of Germany .

*Primary Examiner*—Bernard Helfin
*Attorney, Agent, or Firm*—Gene Harsh; Joseph C. Gil; Lyndanne M. Whalen

[57] ABSTRACT

Low molecular weight N- and O-substituted diurethanes and/or polyurethanes are prepared by reacting a diamine and/or polyamine containing a primary amino group with an N-aryl-0-alkyl urethane in the presence of at least one high boiling alcohol. This reaction may be carried out at a temperature of from 180° to 350° C. and a pressure of approximately 0.1 to 1,500 mbar. The arylamine corresponding to the N-ary-0-alkyl urethane which forms during this reaction is continuously removed from the reaction mixture.

13 Claims, No Drawings

PROCESS FOR THE PREPARATION OF N- AND O-SUBSTITUTED DIURETHANES AND/OR POLYURETHANES

This application is a continuation of application Ser. No. 354,976 filed Mar. 5, 1982 and now abandoned.

BACKGROUND OF THE INVENTION

This invention relates to a process for the preparation of N- and O-substituted low molecular weight aliphatic or aromatic diurethanes and/or polyurethanes in which a primary diamine and/or polyamine is reacted with N-aryl-O-alkyl urethane in the presence of a high boiling alcohol.

The phosgene-free preparation of urethanes and thermal cleavage thereof to form the corresponding isocyanates represents one alternative to preparation of isocyanates by phosgenation of the corresponding amines. Monourethanes which are aromatically substituted on the nitrogen and aliphatically substituted on the oxygen (for example, N-phenyl-O-ethyl-urethane) have been prepared in high yields by various phosgene-free methods. However, known methods for preparing low molecular weight diurethanes and/or polyurethanes which are either aliphatically or aromatically substituted on the nitrogen and aliphatically substituted on the oxygen have serious disadvantages. It is these diurethanes and/or polyurethanes which are technically significant because only they yield the diisocyanates and/or polyisocyanates which are suitable for producing polyurethanes.

The process for the preparation of aromatic di- and/or poly-urethanes from the corresponding amines, urea and alcohol described in German Offenlegungsschrift No. 2,917,569 for example, is disadvantageous in that urea and alcohol are used in large excess so that a high proportion of the urea reacts to form an alkyl carbamate. Since urea and N-unsubstituted carbamates tend to decompose at elevated temperatures, by-products which are non-volatile (such as cyanuric acid, biuret, cyanuric acid triureide, amelide and cyamelide) and which are very difficult to separate from the reaction product may form. Moreover, urea is volatile at high temperatures and forms a solid deposit in the cool parts of the apparatus. Such a solid deposit may cause blockage of pipes and condensers.

The process for the preparation of aliphatic diurethanes and/or polyurethanes described in German Offenlegungsschrift No. 2,917,493 has the disadvantage that considerable quantities of polyurea are formed as by-product. This formation of polyurea is unavoidable since the more highly nucleophilic aliphatic and cycloaliphatic diamines and/or polyamines react much more quickly with urea than the accompanying alcohol. Polyurea, on the other hand, reacts slowly with alcohol to form urethane and amino groups, so that the reaction times are undesirably long.

The processes described in published European Patent Application Nos. 18,581 and 18,583 and German Offenlegungsschrift Nos. 2,917,490 and 2,917,568 are directed to the preparation of aliphatic and aromatic diurethanes and/or polyurethanes from N-unsubstituted carbamic acid esters ("carbonyl source"). These processes have the disadvantage that carbamate must be used in great excess or additional urea must be added. The reaction times described in the examples are very high and the yields are comparatively poor. Such poor yields are attributable to the undesirable formation of by-products, in particular of polyureas.

SUMMARY OF THE INVENTION

It is an object of the present invention to provide a process for the production of low molecular weight N- and O-substituted diurethanes and/or polyurethanes.

It is another object of the present invention to provide a process for the production of N- and O-substituted polyurethanes in high yield.

It is also an object of the present invention to provide a process for the production of N- and O-substituted diurethanes and/or polyurethanes in which the polyamine is almost completely converted without formation of significant amounts of by-products within comparatively short reaction times.

These and other objects which will become apparent to those skilled in the art are accomplished by reacting a diamine and/or polyamine having primary amino groups with an N-aryl-O-alkyl substituted urethane in the presence of at least one high boiling alcohol at elevated temperature. The arylamine formed during the reaction is removed from the reaction mixture continuously (e.g., by distillation). The reaction is generally carried out at a temperature of 180° to 300° C. and pressure of 0.1 to 1,500 mbar.

DETAILED DESCRIPTION OF THE INVENTION

In the process of the present invention, a diamine and/or polyamine is reacted with an N-aryl-O-alkyl urethane in the presence of at least one high boiling alcohol. This reaction is accompanied by the splitting off of an arylamine. This process is particularly advantageous (in comparison with the processes described in German Offenlegungsschriften Nos. 2,917,490 and 2,917,568) in that no gaseous ammonia is formed. Rather, in the present invention only comparatively difficultly volatile arylamine (which must be removed from the reaction mixture) is formed. Consequently, diamine and/or polyamine undergoes virtually complete conversion without formation of significant amounts of by-products within comparatively short reaction time.

The starting materials used in the process of the present invention are: (a) organic diamines and polyamines having primary amino groups, (b) high boiling alcohols having primary or secondary hydroxyl groups and (c) N-aryl-O-alkyl urethanes.

Suitable diamines and/or polyamines include any organic compounds which have at least 2 primary amino groups and which are otherwise inert under the reaction conditions. Particularly suitable amines are those corresponding to the formula

wherein $R^1$ represents an aliphatic hydrocarbon group having a total of 4 to 18 carbon atoms optionally having inert substituents; a cycloaliphatic hydrocarbon group having a total of 6 to 28 carbon atoms optionally having inert substituents and/or optionally containing oxygen; sulfur or alkylene groups as bridging members; an aromatic hydrocarbon group having a total of 6 to 28 carbon atoms optionally containing inert substituents and/or having oxygen, sulfur or alkylene groups as bridging members; or an araliphatic hydrocarbon group having a total of 7 to 28 carbon atoms optionally having inert substituents; and n represents an integer greater than or equal to 2. The value of n is generally an integer from 2 to 6, preferably 2 or 3.

It is preferred to use diamines and/or polyamines corresponding to the above-given general formula in which $R^1$ represents a saturated, unsubstituted aliphatic hydrocarbon group having 4 to 12 carbon atoms; a saturated cycloaliphatic hydrocarbon group having a total of 6 to 25 carbon atoms which is optionally alkyl substituted and/or optionally has methylene bridges; or an aromatic hydrocarbon group having a total of 6 to 25 carbon atoms which is optionally alkyl substituted and/or optionally has methylene bridges; and n represents 2 or 3.

Examples of suitable diamines and/or polyamines include tetramethylene diamine, hexamethylene diamine, 2,2,4-trimethyl-hexamethylene diamine, isophorone diamine, 1,4-diaminocyclohexane, 4,4'-diaminodicyclohexyl methane, 2,4- and 2,6-diamino-1-methyl cyclohexane, 4,4'-diamino-3,3'-dimethyl-dicyclohexyl methane, 4-aminocyclohexyl-4-aminophenyl methane, 1,3- and 1,4-diaminobenzene, 2-chloro-1,4-diaminobenzene, 2,4- and 2,6-diaminotoluene, 1,3-bis-(aminomethyl)-4,6-dimethyl benzene, 1,3-diamino-2,6-diethyl-4-methylbenzene, 1,3- diamino-2,4,6-triisopropyl benzene, 1,5-diaminonaphthalene, 2,7-diaminonaphthalene, benzidine, 3,3'-dichlorobenzidine, 4,4'-diaminodiphenyl methane (and crude products), isomeric mixtures of 2,4'-, 2,2'- and 4,4'-diaminodiphenyl methane, 3,3'-dichloro-4,4'-diaminodiphenyl methane, 3,3',5,5'-tetra isopropyl-4,4'-diamino-diphenyl methane, 2,2-bis-(4-aminophenyl)-propane, 1,1-bis-(4-aminophenyl)-cyclohexane, 4,4',4''-triamino-triphenyl methane, 4,4'-diamino-diphenyl ether, 1,4-xylylene diamine, 3,4'-diamino-4-methyl-diphenyl methane and/or its isomers or 3,5,4'-triamino-4-methyl-diphenyl methane and/or its isomers. Mixtures of any of these diamines and/or polyamines may also be used in the process of the present invention.

The diamino diphenyl methane isomers mentioned above may also be used as mixtures with higher nuclear homologs, such as the known aniline/formaldehyde condensates (obtained in the presence of acid catalysts) referred to as "polyamine mixtures of the diphenyl methane series".

The higher boiling alcohols used in the process of the present invention may be any organic compound containing an aliphatically, cycloaliphatically or araliphatically bound primary or secondary hydroxyl group which has a boiling point of at least 190° C. at atmospheric pressure and which with the exception of the hydroxyl group is inert under the reaction conditions. Particularly suitable higher boiling alcohols include those corresponding to the formula

wherein $R^2$ represents an aliphatic hydrocarbon group having a total of 6–18 carbon atoms optionally having inert substituents and/or ether groups; a cycloaliphatic hydrocarbon group having a total of 8–15 carbon atoms optionally having inert substituents; or an araliphatic hydrocarbon group having a total of 7–18 carbon atoms optionally having inert substituents.

Alcohols corresponding to the above-given formula in which $R^2$ represents a saturated, primary aliphatic hydrocarbon group having 8–18 carbon atoms optionally containing ether bridges are preferred. Such alcohols should generally have a boiling point at atmospheric pressure which is at least 5° C. and preferably at least 20° C. above that of the arylamine which is to be split off. Suitable alcohols $R^2$—OH have primary or secondary, preferably primary hydroxyl groups.

The following are examples of suitable alcohols: 1-octanol, 1-nonanol, 1-decanol, 1-undecanol, 1-dodecanol, 1-tetradecanol, 1-hexadecanol, 1-octadecanol, 2-nonanol, diethylene glycol monoethyl ether, benzyl alcohol, 2,4,5-trimethyl-cyclohexanol, 3-methyl-benzyl alcohol, cyclooctanol, 1,2,4-trimethyl-cyclohexan-5-ol, and 4-methylbenzyl alcohol. Mixtures of such alcohols may also be used.

N-aryl-O-alkyl urethanes suitable for the process of the present invention include those corresponding to the formula

wherein $R^3$ represents an aromatic hydrocarbon group having a total of 6–10 carbon atoms optionally carrying inert substituents and $R^4$ represents an aliphatic hydrocarbon group having a total of 1–18 carbon atoms optionally carrying inert substituents and/or ether bridges; a cycloaliphatic hydrocarbon group having a total of 4–15 carbon atoms optionally carrying inert substituents; or an araliphatic hydrocarbon group having a total of 7–18 carbon atoms optionally carrying inert substituents.

It is preferred to use urethanes of the above-mentioned general formula wherein $R^3$ represents a phenyl or tolyl group, in particular a phenyl group, and $R^4$ represents a group which conforms to the definition of $R^2$ and is preferably but not necessarily the same as $R^2$.

The urethanes used as reactants in the process of the present invention are therefore preferably compounds such as N-phenyl-(or N-tolyl-)-O-1-octylurethane, N-phenyl(or N-tolyl)-1-decyl-urethane, N-phenyl-(or N-tolyl)-1-undecyl-urethane, N-phenyl (or N-tolyl-)-1-dodecyl-urethane, N-phenyl (or N-tolyl)-1-tetradecyl-urethane, N-phenyl (or N-tolyl-)1-hexadecyl-urethane, N-phenyl (or N-tolyl-)-1-octadecyl-urethane, N-phenyl (or N-tolyl-)-2-nonylurethane, N-phenyl (or N-tolyl-)ethoxy-ethoxy-ethylurethane, N-phenyl(or N-tolyl-)-2,4,5-trimethylcyclohexyl-urethane, N-phenyl (or N-tolyl-)-3-methylbenzyl-urethane or N-phenyl (or N-tolyl-)-4-methylbenzyl-urethane. The alcohol from which the urethane is derived generally has primary or secondary, preferably primary hydroxyl groups.

The reactant urethanes corresponding to the above-given general formula may also include urethanes in which the group $R^4$ is derived from an alcohol boiling below 190° C. at normal pressure Thus, urethanes in which $R^4$ denotes a primary or secondary (preferably primary) saturated aliphatic hydrocarbon group having 1–4 carbon atoms may be advantageously employed in the process of the present invention. When such urethanes are used, the low boiling alcohol $R^4$—OH is displaced by the high boiling alcohol $R^2$—OH before, during and/or after the arylamine $R^3$—$NH_2$ is split off. The low boiling alcohol then distills from the reaction mixture before and/or together with and/or after the arylamine. Because this transurethanization generally proceeds more rapidly than the reaction which occurs in the present invention, this variation (i.e., use of a urethane derived from a low boiling alcohol) amounts to an in situ preparation of the reactant urethane based on a high boiling alcohol.

The reactant urethanes may in principle be prepared by any of the methods known in the art. In one such method, arylamine $R^3$—NH is reacted with urea and alcohol $R^4$—OH.

The preferred reactant urethanes in the process of the present invention are based on alcohols $R^4$—OH which boil at a temperature of at least 190° C. at atmospheric pressure. These urethanes may be prepared before the process of the present invention by a transurethanization of urethanes which correspond to the reactant urethanes with respect to the N-substituent but are based on lower boiling alcohols. To achieve this transurethanization, it is generally sufficient to heat a urethane based on a lower boiling alcohol together with a 0.1–5 molar excess of an alcohol $R^2$—OH to about 130°–300° C. and continuously remove the low boiling alcohol by distillation as it is formed. The N-aryl-O-alkyl urethanes based on low boiling alcohols required for this purpose may be obtained by the usual methods employed in the art.

In the process according to the invention, the reactant diamine and/or polyamine, alcohol and urethane are used in quantities such that the molar ratio of alcohol to amino groups of the di- and/or polyamine is in the range of 1:1 to 50:1, preferably 2:1 to 15:1. The molar ratio of urethane to amino groups of the di- and/or polyamine should be in the range of 1:1 to 5:1, preferably 1.2:1 to 2.5:1. The molar ratio of alcohol to urethane is therefore generally in the range of 1:1 to 10:1.

Catalysts may also be used when carrying out the process of the present invention. Any catalyst which catalyzes the esterification of carboxylic acids is suitable for accelerating the reaction of the present invention. Such catalysts include (i) inorganic or organic bases which are inert under the reaction conditions, (ii) Lewis acids and (iii) salts or complex compounds, in particular chelates of transition metals.

The following are examples of suitable catalysts of group (i): tertiary amines such as triisopentylamine, diethylbenzylamine, N,N-dimethyl-benzylamine, (2-methoxypropyl)-amine, 2-(diethylaminoethyl)-phenyl ether, oxethylmorpholine, N-(2-diethylaminoethyl)-benzamide, N-(2-diethylaminoethyl)-propionamide,- 1,4-diaza-(2,2,2)-bicyclooctane, N,N-dimethyl-4-aminopyridine; 1-azabicycloheptanes; 1-azabicyclooctanes; saturated polyheterocyclic amines such as 3-methyl conidine, 1-azabicyclo-(3,2,1)octane; pyrrolizidines; quinoclidines; alcoholates such as sodium methylate, sodium ethylate, potassium-t-butylate or titanium tetrabutylate; phenolates such as sodium phenolate or titanium tetraphenolate; inorganic bases such as beryllium hydroxide and sodium, potassium, lithium, magnesium, barium, and calcium hydroxide; basic alkali metal salts such as sodium carbonate, sodium sulfide, potassium carbonate, or trisodium phosphate; and alkali metal salts of fatty acids or sulfonic acids.

Examples of suitable catalysts (ii) include Lewis acids such as iron(II)chloride, iron(III)chloride, zinc chloride, tin(II)chloride, tin(IV)chloride, aluminum chloride, zinc cyanide, thallium trichloride, boron trifluoride and boron trifluoride etherate.

Examples of suitable catalysts of group (iii) include: salts of transition metals not already in group (ii); and complex compounds (particularly chelates) of these metals, such as cobalt, manganese or lead naphthenates; iron oleates or carbonyls; acetyl acetonates of iron, nickel, cobalt, zinc, lead, aluminum, manganese, magnesium, molybdenum, titanium, thorium, zirconium or vanadium; bis-(dibenzoyl methane)-copper; bis-(ethylacetoacetate)-copper and -iron; coordination compounds of titanium, zirconium, hafnium, thorium, and manganese with β-diketones, β-keto esters and β-hydroxyaldehydes; dibutyl tin dilaurate; dibutyl tin diacetate; di-(2-ethylhexyl)-tin oxide; dioctyl-tin oxide; tin salts of $C_1$–$C_{20}$ carboxylic acids, such as tin-(II)-naphthenate, -hexoate, -palmitate, -stearate or -dimethyl-valerate; acetates, chlorides, sulfates or octoates of di-valent or tri-valent cobalt, of mono-valent or di-valent copper and of zinc or di-valent lead.

Particularly suitable catalysts include: zinc chloride, zinc acetate, zinc octoate, zinc oxide, zinc cyanide, dibutyl tin oxide, dibutyl tin diethylate, dimethyl tin dichloride, tin(II)chloride, tin(IV)chloride, dibutyl tin dilaurate, cobalt triacetate, cobalt trichloride, cobalt trioctoate, copper(II)acetate, copper chloride, copper-(II)sulfate, lead acetate and lead chloride.

The quantity of catalyst used should generally be from 1 ppm to 20 wt. %, preferably 100 ppm to 5 wt. (based on the sum of starting materials). One would, of course, generally keep the concentration of catalysts as low as possible. The optimum catalyst concentration depends upon the nature of the starting materials and the activity of the particular catalyst. This optimum concentration may be readily determined by a simple preliminary test.

When preparing diurethanes and/or polyurethanes based on diisocyanates and/or polyisocyanates which cannot be purified by distillation, it is preferable that those diurethanes and/or polyurethanes be prepared without catalysts in order to prevent contamination of the diisocyanates and/or polyisocyanates with such catalysts. The reaction of the present invention should generally be carried out within the temperature range of from 180° to 300° C., preferably from 200° to 250° C. and at a pressure of from 0.1 to 1,500 mbar, preferably from 10 to 1,000 mbar, most preferably from 200 to 600 mbar (i.e., preferably below atmospheric pressure). The pressure may be advantageously adjusted so that a mixture of arylamine $R^3$—NH alcohol $R^2$—OH (and in some cases alcohol $R^4$—OH) distills over the column into a receiver. If the reactant urethane is based on a high boiling alcohol, however, the substance distilling over should be pure arylamine.

The reaction of the present invention is generally completed after a reaction time of 1 to 20 hours, preferably 2 to 10 hours, most preferably 3 to 6 hours. In the process of the present invention, is is preferable that the reactant urethane and alcohol be introduced into the reactor in the proportions indicated above prior to addition (with vigorous mixing) of the reactant diamine and/or polyamine. The reactant diamine and/or polyamine may be used in the form of a solution in alcohol $R^2$—OH. The volatile constituents of the reaction mixture and the volatile secondary products (particularly the arylamine) formed, are continuously removed from the reaction mixture by distillation so that the equilibrium of the reaction shifts in the direction of the desired end product. This assures quantitative conversion of the di- and/or polyamine. After termination of the reaction, the excess reactant alcohol present may be removed from the end product by vacuum distillation, preferably by means of a thin layer evaporator.

The end products formed in the process of the present invention are N,O-substituted low molecular weight (i.e., with a molecular weight generally below 1,500) diurethanes and/or polyurethanes corresponding to the formula $$R^1(\text{—NHCOOR}^2)_n$$

wherein n, $R^1$ and $R^2$ have the meanings indicated above.

When the reactant urethanes are based on high boiling alcohols which are not identical with the alcohol $R^2$—OH, the process of the present invention yields diurethanes and/or polyurethanes corresponding to the last-mentioned general formula in which the group $R^2$ is partly replaced by the group $R^4$ which differs from $R^2$.

When the alcohol component of the reactant urethane corresponds to the reactant alcohol, the process of the present invention proceeds according to the following equation:

$$R^1\text{—(NH}_2)_n + nR^3\text{—NHCOO—R}^2 \xrightarrow{R^2\text{—OH}} R^1(\text{—NHCOOR}^2)_n + nR^3\text{—NH}_2$$

When the reactant urethanes are based on readily volatile alcohols $R^4$—OH, the reaction of the present invention proceeds in accordance with the following equation:

$$R^1(\text{NH}_2)+nR^3\text{—NHCOO—R}^4+nR^2\text{—OH}\rightarrow R^1(\text{—NHCOOR}^2)_n+nR^3\text{—NH}_2+nR^4\text{—OH}$$

It must be regarded as surprising that in the process of the present invention, the formation of unwanted polyureas is virtually completely suppressed despite the fact that the reaction takes place at a temperature at which urethanes are normally split into their corresponding isocyanates and alcohols. One skilled in the art would have expected the isocyanate $R^1(\text{NCO})_n$ present and to combine with the reactant diamine and/or polyamine to form unwanted polyureas. This unwanted side reaction, however, is not observed in the practice of the present invention.

The products of the process of the present invention may be transurethanized with low boiling alcohols having a boiling point below 140° C. (at atmospheric pressure). Such low boiling alcohols include $C_1$–$C_4$ alkanols of the formula $$R^5\text{—OH}$$

wherein $R^5$ denotes an aliphatic hydrocarbon group having 1 to 4 carbon atoms.

Such transurethanization converts the urethanes produced in the process of the present invention into diurethanes and/or polyurethanes of the formula $$R^1(\text{—NHCOOR}^5)_n$$

when carried out under pressure at 120° to 300° C. The alcohol $R^5$—OH is generally used in this reaction in a quantity of 5 to 60, preferably 10 to 20 mol of alcohol per urethane group. After a reaction time of 0.5 to 10 hours, preferably 1 to 4 hours, the low boiling alcohol is evaporated, and the high boiling alcohol liberated is subsequently distilled from the reaction mixture at 0.1 to 5 mbar. This transurethanization has been described in detail, for example, in European Patent Application No. 80 106 250.6.

The resulting diurethanes and/or polyurethanes corresponding to the formula $$R^1(\text{—NHCOOR}^5)_n$$

may subsequently be split by heat in known manner into organic polyisocyanates of the formula $$R^1(\text{NCO})_n$$

and alcohols of the formula $$R^5\text{—OH}$$

Having thus described our invention, the following examples are given by way of illustration. The percentages given therein are percents by weight, unless otherwise indicated.

EXAMPLES

Example 1

381.3 g (1.25 mol) of N-phenyl-0-1-dodecylurethane in 370 g of 1-dodecanol were introduced into a 2 liter 4-necked flask equipped with stirrer, heated dropping funnel, a packed column and internal thermometer. The mixture was then heated to 240° C. 99g (0.5 mol) of 4,4'-diaminodiphenyl methane were added dropwise with stirring at a pressure of 500 mbar over a period of one hour at a rate such that any spontaneously formed aniline was distilled off through the column. Stirring was continued for an additional 4 hours with the same temperature being maintained and removal of aniline by distillation continued. The vacuum was changed to 300 mbar. 301.7g (97% of the theoretical yield) of 4,4'-methylene-bis-(phenylcarbamic acid dodecyl ester) were formed (determined by high pressure liquid chromatography).

Example 1a (Comparison example using urea as "carbonyl source")

A 2 liter 4-necked flask was equipped with stirrer, internal thermometer, heatable dropping funnel and a reflux condenser. A gas tube attached to the reflux condenser extended into a 1N HCl solution. 150.2 g (2.5 mol) of urea and 744 g (4 mol) of n-dodecanol were introduced into the reaction vessel and heated to 240° C. with stirring. Immediately after the onset of vigorous evolution of ammonia at 145° C., 198.0 g (1 mol) of molten 4,4'-diaminodiphenyl methane were added dropwise over a period of 2.5 hours.

Stirring was continued for an additional 2.5 hours at 240° C. After 4 mol of ammonia had been liberated, the cloudy melt was analyzed by high pressure liquid chromatography. According to this analysis, 365.8 g (59% of the theoretical yield) of 4,4'-methylene-bis-(phenyl carbamic acid dodecyl ester) and 80.4 g (20% of the theoretical yield) of 4-(4-aminobenzyl)-phenyl carbamic acid dodecyl ester were obtained.

Example 1b (Comparison example using an N-unsubstituted urethane as "carbonyl source")

A 2 liter 4-necked flask was equipped with stirrer, internal thermometer, heatable dropping funnel, steam heated fractionating column and distillation bridge. A mixture of 178 g (2 mol) of ethyl carbamate and 740 g of dodecanol was slowly heated to 240° C. and the ethanol formed was distilled off. When the reaction mixture had reached a temperature of 120° C., 198 g (1 mol) of molten 4,4′-diaminodiphenyl methane were added dropwise in the course of 1.3 hours. The mixture was then stirred for 4 hours at 240° C. The yield (determined by high pressure liquid chromatography) was 382.1 g (61% of the theoretical yield) of 4,4′-methylene-bis-(phenyl carbamic acid dodecyl ester) and 87.8 g (21% of the theoretical yield) of 4-(4-aminobenzyl)-phenyl carbamic acid dodecyl ester. The crude product contained 49.6 g of a solid which was insoluble in hot acetone, melted at 215°–300° C. and according to IR spectroscopy contained urea groups.

Example 2

Using the apparatus described in Example 1, 762.5 g (2.5 mol) of N-phenyl-O-dodecyl urethane in 370 g of dodecanol were heated to 240° C. with stirring. 100 g of a commercial mixture of 4,4′-, 2,4′- and 2,2′-diaminodiphenyl methane and polyphenyl-polymethylene polyamines were added dropwise at 500 mbar within 1 hour and the reaction mixture was then stirred for 4 hours at the same temperature.

During this time, 93.0 g (100% of theoretical) of aniline distilled over. The crude product contained 295.5 g of a mixture of 2,2′-, 2,4′- and 4,4′-methylene-bis-(phenylcarbamic acid dodecyl ester) and polyphenyl-polymethylene-polydodecyl urethanes. (Analysis by gel chromatography.)

Example 3

762.5 g (2.5 mol) of N-phenyl-O-dodecyl urethane in 370 g of dodecanol were heated to 240° C. in the apparatus described in Example 1. 106 g (0.5 mol) of a mixture of various diamino-methyl-diphenyl methane isomers were added dropwise in the course of 1 hour and any aniline formed was removed by distillation at 500 mbar. Stirring was continued for 5 hours at 240° C., and 93 g (100% of theoretical) of aniline were distilled off during this time. 283.9 g (89% of the theoretical) of an isomeric mixture of methyl-diphenyl methane-bis-(carbamic acid dodecyl ester) were formed as determined by gel chromatography.

Example 4

762.5 g (2.5 mol) of N-phenyl-O-dodecyl urethane in 370 g of dodecanol were heated to 220° C. in a manner analogous to Example 1, and 61 g (0.5 mol) of 2,4-diaminotoluene were added dropwise in the course of 1 hour. The mixture was stirred for an additional 5½ hours at the same temperature and aniline was simultaneously distilled off at reduced pressure (500–300 mbar). According to high pressure liquid chromatography, the yield was 270.1 g (99% of the theoretical) of toluene-2,4-bis-(carbamic acid dodecyl ester).

Example 5

79 g (0.5 mol) of 1,5-naphthylene diamine and 762.5 g (2.5 mol) of N-phenyl-O-dodecyl urethane in 370 g of dodecanol were heated to 220° C. in a 2 liter 4-necked flask equipped with stirrer, column and internal thermometer. A vacuum of 500 mbar was applied and the aniline formed in the reaction was immediately distilled off over the column. 253.0 g (87% of theoretical) of naphthalene-1,5-bis-(carbamic acid dodecyl ester) formed after a reaction time of 5 hours. The yield was determined by high pressure liquid chromatography.

Example 6

762.5 g (2.5 mol) of N-phenyl-O-dodecyl urethane in 370 g of dodecanol were heated to 240° C. in the apparatus described in Example 1. 58 g (0.5 mol) of hexamethylene diamine were added dropwise within 1 hour. The reaction was left to continue for an additional 4 hours and the aniline formed in the reaction was removed from the reaction mixture by vacuum distillation. 264.6 g (98% of the theoretical) of 1,6-hexamethylene-bis-(carbamic acid dodecyl ester) were formed as determined by gel chromatography.

Example 7

A solution of 702.5 g (2.5 mol) of N-phenyl-O-dodecyl urethane in 270 g of dodecanol was heated to 240° C. as described in Example 1. A solution of 110 g (0.5 mol) of trans, trans-4,4′-diamino-dicyclohexyl methane in 190 g of dodecanol was added dropwise with stirring in the course of 1½ hours. The mixture was stirred for an additional 4 hours and 93.0 g (100% of theoretical) of aniline was distilled off under vacuum during this time.

According to gel chromatography, the yield of dicyclohexyl methane-trans, trans-4,4′-bis-(carbamic acid dodecyl ester) was 304.2 g (96% of the theoretical).

Example 8

305 g (1 mol) of N-phenyl-0-dodecyl urethane in 560 g of dodecanol were heated to 240° C. in a manner analogous to Example 1. 110 g (0.5 mol) of isophorone diamine were added in the course of 1 hour. The aniline formed was distilled off at a pressure of 660–450 mbar. The reaction was completed after 4 hours stirring at 240° C. According to gel chromatography, 291.3 g (98% of theoretical) of 1-(dodecoxy carbonylamino)3,3,5-trimethyl-5-(dodecoxy carbonylamino-methyl)-cyclohexane formed.

Example 9

(9a) Preparation of N-phenyl-0-1-dodecyl urethane 400.4 g (4.3 mol) of aniline, 258.3 g (4.3 mol) of urea and 2,399.4 g (12.9 mol) of n-dodecanol were introduced into a 6 liter 4-necked flask equipped with stirrer, internal thermometer, reflux condenser and gas discharge tube. The reaction mixture was heated to 240° C. in the course of 1½ hours with stirring and stirred at this temperature for an additional 9 hours. The ammonia liberated was transferred to a washing column through the distillation column.

(9b) Process according to the invention 336.6 g (1.7 mol) of 4,4′-diaminodiphenyl methane were introduced dropwise in the course of 1 hour at 240° C., with vigorous mixing, into the solution of N-phenyl-0-1-dodecyl-urethane in excess n-dodecanol obtained in (9a). The aniline which formed spontaneously was immediately and continuously distilled off through a column at a pressure of about 400–500 mbar. Dodecanol was then distilled off at 0.1 mbar. 1,004.5 g (95% of theoretical) of 4,4′-methylene-bis-(phenyl carbamic acid dodecyl ester) were obtained by this method.

Example 10

692.5 g (2.5 mol) of N-phenyl-0-decyl urethane in 320 g of decanol were reacted with 99 g (0.5 mol) of 4,4'-diaminodiphenyl methane by the method described in Example 1. 93 g (100% of theoretical) of aniline were distilled off in the course of 5 hours. 273.8 g (97% of theoretical) of 4,4'-methylene-bis-(carbamic acid decyl ester) were obtained. (Analysis was carried out by high pressure liquid chromatography).

Example 11

206.3 g (1.25 mol) of N-phenyl-0-ethyl urethane in 600 g of n-dodecanol were heated to 240° C. with stirring in the apparatus described in Example 1. 99 g (0.5 mol) of 4,4'-diaminodiphenyl methane were then added dropwise in the course of 45 minutes and the reaction mixture was maintained at 240° C. for an additional 4.5 hours. Ethanol and aniline which formed as by-products in the reaction were immediately removed by distillation. For a continuous separation of these two compounds, a vacuum was applied in the course of the reaction and continuously increased so that towards the end of the reaction the pressure was 360 mbar. According to high pressure liquid chromatography, the crude product contained 292.0 g (94% of theoretical) of methylene-bis-(phenyl carbamic acid dodecyl ester).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a low molecular weight N- and O-substituted diurethane and/or polyurethane comprising:
   (a) reacting a diamine and/or polyamine having primary amino groups with an N-aryl-O-alkyl urethane in the presence of at least one high boiling alcohol at an elevated temperature; and
   (b) continuously removing the thus-formed arylamine corresponding to the N-aryl-O-alkyl urethane from the reation mixture by distillation.

2. The process of claim 1 wherein the diamine and/or polyamine corresponds to the formula $$R^1(NH_2)_n$$

wherein
R$^1$ represents an aliphatic hydrocarbon group having a total of 4 to 18 carbon atoms which group may contain an inert substituent; a cycloaliphatic hydrocarbon group having a total of 6 to 28 carbon atoms which group may contain an inert substituent and/or an oxygen, sulfur or alkylene group as a bridge member; an aromatic hydrocarbon group having a total of 6 to 28 carbon atoms which group may contain an inert substituent and/or an oxygen, sulfur or alkylene group as a bridge member; or an araliphatic hydrocarbon group having a total of 7 to 28 carbon atoms which group may contain an inert substituent; and
n represents an integer greater than or equal to 2.

3. The process of claim 1 wherein the high boiling alcohol is a primary or secondary aliphatic, cycloaliphatic and/or araliphatic alcohol which has a boiling point of at least 190° C. at atmospheric pressure and which corresponds to the formula $$R^2\text{—OH}$$

wherein
R$^2$ represents an aliphatic hydrocarbon group having a total of 6 to 18 carbon atoms which group may contain an inert substituent and/or ether group; a cycloaliphatic hydrocarbon group having a total of 8 to 15 carbon atoms which group may include an inert substituent; or an araliphatic hydrocarbon group having a total of 7 to 18 carbon atoms which group may contain an inert substituent.

4. The process of claim 1 wherein the N-aryl-0-alkyl urethane corresponds to the formula $$R^3\text{—NHCOO—}R^4$$

wherein
R$^3$ represents an aromatic hydrocarbon group having a total of 6 to 10 carbon atoms which group may contain an inert substituent; and
R$^4$ represents an aliphatic hydrocarbon group having a total of 1 to 18 carbon atoms which group may contain an inert substituent and/or ether bridge; a cycloaliphatic hydrocarbon group having a total of 4 to 15 carbon atoms which group may contain an inert substituent; or an araliphatic hydrocarbon group having a total of 7 to 18 carbon atoms which group may contain an inert substituent.

5. The process of claim 1 wherein the high boiling alcohol corresponds to the alcohol component of the N-aryl-0-alkyl urethane.

6. The process of claim 5 wherein the N-aryl-0-alkyl urethane is prepared in situ.

7. The process of claim 6 wherein the N-aryl-0-alkyl urethane has an alcohol component having a lower boiling point than the reactant high boiling alcohol is reacted with excess quantities of the high boiling alcohol at elevated temperatures prior to or simultaneous with the reaction of (a).

8. The process of claim 7 wherein the low boiling alcohol which forms is removed from the reaction mixture by distillation.

9. The process of claim 1 wherein the reaction of step (a) is carried out within the temperature range of 180° to 300° C.

10. The process of claim 1 wherein step (a) is carried out at reduced pressure.

11. The process of claim 1 wherein a mixture of the N-aryl-0-alkyl urethane and the high boiling alcohol in which the molar ratio of alcohol to urethane is from 1:1 to 10:1 is introduced into a reaction vessel and heated to reaction temperature before the diamine and/or polyamine is fed into the vessel.

12. The process of claim 11 wherein the reactants are employed in quantities such that for each amino group there are 1 to 5 urethane groups present.

13. The process of claim 1 wherein step (a) is carried out in the presence of a catalyst selected from the group consisting of organic bases, inorganic bases, Lewis acids and salts, complex compounds of transition metals, and mixtures thereof.

* * * * *